United States Patent [19]
Nelms

[11] Patent Number: 5,419,594
[45] Date of Patent: May 30, 1995

[54] QUICK-CONNECT CONDUIT COUPLING

[75] Inventor: Edwin Nelms, Taylor, Mich.

[73] Assignee: W. A. Thomas Co., Taylor, Mich.

[21] Appl. No.: 162,411

[22] Filed: Dec. 3, 1993

[51] Int. Cl.⁶ .............................................. F16L 37/18
[52] U.S. Cl. ..................................... 285/315; 285/321
[58] Field of Search ....................... 285/308, 315, 321

[56] References Cited

U.S. PATENT DOCUMENTS

| | | | |
|---|---|---|---|
| 4,298,220 | 11/1981 | Kukuminato | 285/308 X |
| 4,564,221 | 1/1986 | Ishii | 285/321 X |
| 4,747,626 | 5/1988 | Hama et al. | 285/308 |
| 4,872,710 | 10/1989 | Konecny et al. | 285/321 X |
| 5,193,856 | 3/1993 | Suzuki | 285/308 |
| 5,226,682 | 7/1993 | Morrison et al. | 285/321 X |

*Primary Examiner*—Dave W. Arola
*Attorney, Agent, or Firm*—Robert C. Tucker; William David Kiesel

[57] ABSTRACT

A coupling for connecting sections of conduit is provided, comprising an insertion member, a receiving member, a release collar, a first resilient ring member, and a second resilient ring member. The insertion member includes a plurality of O-rings for sealing against a mating surface of the receiving member, which is sized to receive the insertion member. The insertion member is circumferentially held within the receiving member by a resilient split ring which prevents accidental disconnection. A release collar is slidably and captively disposed between the receiving member and the insertion member, and is used to disengage the split ring from around the insertion member upon disconnection. The invention uses a minimum of parts, and enables a coupling connection to be made by using only one hand.

4 Claims, 3 Drawing Sheets

QUICK-CONNECT CONDUIT COUPLING

BACKGROUND OF THE INVENTION

1. Field of the Invention

The present invention relates generally to couplings used to connect sections of conduit, and more particularly to those couplings which may be assembled with a minimum of manual manipulation.

2. Description of Prior Art

In a multitude of industrial and automotive applications, it is often desired to connect sections of conduit to one another for completing a flow circuit for a particular fluid. Such fluids may be water, fuel, air, and the like. A wide variety of conduit couplings have been developed over the years with much success, and it has become fairly easy to find a coupling to suit the needs of a given situation. The most common such devices are: (1) the threaded coupling, which employs a female portion threaded onto a male portion, with or without an elastomeric seal, and (2) a "ball-lock" device, which uses a female body having a spring-loaded sleeve into which a male nipple is locked. In most cases, it is the latter of these two which predominate, because they are easier to use than threaded couplings, result in a strong connection, and enable the opposite conduit ends to swivel in the cases of flexible conduit applications.

In the ball-lock couplings, a male nipple having an external annular groove is inserted into a female coupler body and is locked therein by a plurality of circumferentially spaced balls which engage the groove. A spring-loaded sleeve forces the balls to protrude into the coupler body, such that the sleeve must be pulled backed in order to release the connection. Despite its advantages, several shortcomings are apparent, especially in automotive assembly environments. First, the ball-lock couplings require two hands for making the connection. For example, one hand must grip the female portion and pull back the sleeve with one hand, while the other hand must grip the male nipple and push it into the female portion. In setups where the female portion is fixed relative to the vehicle, one must still grasp the female portion to release the sleeve, preventing the worker from making the connection with only one hand. These time-consuming operations can become very expensive to a manufacturer, because productivity is critically dependent on the time it takes workers to complete these tasks, especially when they are repeated many thousands of times.

Second, such couplings can be accidentally disconnected by inadvertent movement of the sleeve from its locking position, resulting in an additional time to reconnect the coupling and/or fluid loss if the system is functioning. Third, the presence of the external sleeve makes the coupling more bulky than necessary, making it difficult to assemble and disassemble in cramped work spaces. Fourth, the ball-lock devices do not afford a full 360° contact with the male nipple, because the only points of contact are where the limited number of balls touch the groove. Finally, the ball-lock couplings have numerous parts and are relatively expensive to manufacture and install.

What is needed, therefore, is a conduit coupling that can be quickly connected using only one hand, and that is less expensive to produce and operate than its counterparts. Also, such a coupling should achieve these objectives using as few parts as possible, and should be small enough to allow easy manipulation in cramped environments. Ideally, its design should also minimize the possibility of accidental disconnection, but it should still be capable of swiveling to reduce twisting and kinking of flexible conduit. Finally, when the coupling is connected, there should be a strong, uniform 360° contact around the male portion of the coupling to ensure against disengagement.

SUMMARY OF THE INVENTION

It is therefore an object of this invention to provide a quick-connect conduit coupling that may be quickly connected in a single manipulation with one hand.

It is also an object of this invention to provide a quick-connect conduit coupling that has few parts and that is easy to manufacture and assemble.

It is a further object of this invention to provide a quick-connect conduit coupling that provides a uniform 360° sealed connection between the mating parts.

Yet another object of this invention is to provide a quick-connect conduit coupling that is not susceptible to accidental disconnection.

These and other objects and advantages of the present invention will no doubt become apparent to those skilled in the art after having read the following description of the preferred embodiment which are contained in and illustrated by the various drawing figures.

Therefore, in a preferred embodiment, a coupling for connecting sections of conduit is provided, comprising an insertion member, a receiving member, a release collar, a first resilient ring member, and a second resilient ring member. The insertion member has a front end and a rear end, the rear end being connectable to a first conduit section. The insertion member further comprises a first axial passageway in fluid communication with the first conduit section, a plurality of O-rings attached to the front end for sealingly contacting a mating surface of the receiving member, a first external annular groove between the O-rings and the rear end, and an annular ramp between the O-rings and the first external annular groove.

The receiving member also has a front end and a rear end, the rear end being connectable to a second conduit section. The receiving member further comprises a second axial passageway, in fluid communication with the second conduit section, sized to receive the front end of the insertion member, a mating surface within the second axial passageway having dimensions sized to sealably contact the O-rings of the insertion member, a first internal annular groove within the second axial passageway between the mating surface and the front end of the receiving member, and a second internal annular groove within the second axial passageway between the first internal annular groove and the mating surface.

The release collar is slidably and captively disposed within the receiving member, and has a release tip and a handle portion. The release collar further comprises an axial bore sized to receive the front end of the insertion member, a second external annular groove between the release tip and the handle portion, wherein the release tip is slidably movable into the space between the second internal annular groove of the receiving member and the first external annular groove of the insertion member.

The first resilient ring member is disposed within the first internal annular groove of the receiving member and the second external annular groove of the release collar, to prevent the release collar from withdrawing from the receiving member. The second external annular groove is sized to allow the release collar to slide relative to the receiving member. The second resilient ring member is retained within the second internal annular groove of the receiving member, and it is formed to resiliently expand over the annular ramp and to resiliently contract into the first external annular groove of the insertion member when the O-rings are caused to contact the mating surface.

DETAILED DESCRIPTION OF THE PREFERRED EMBODIMENT

Figure 1:
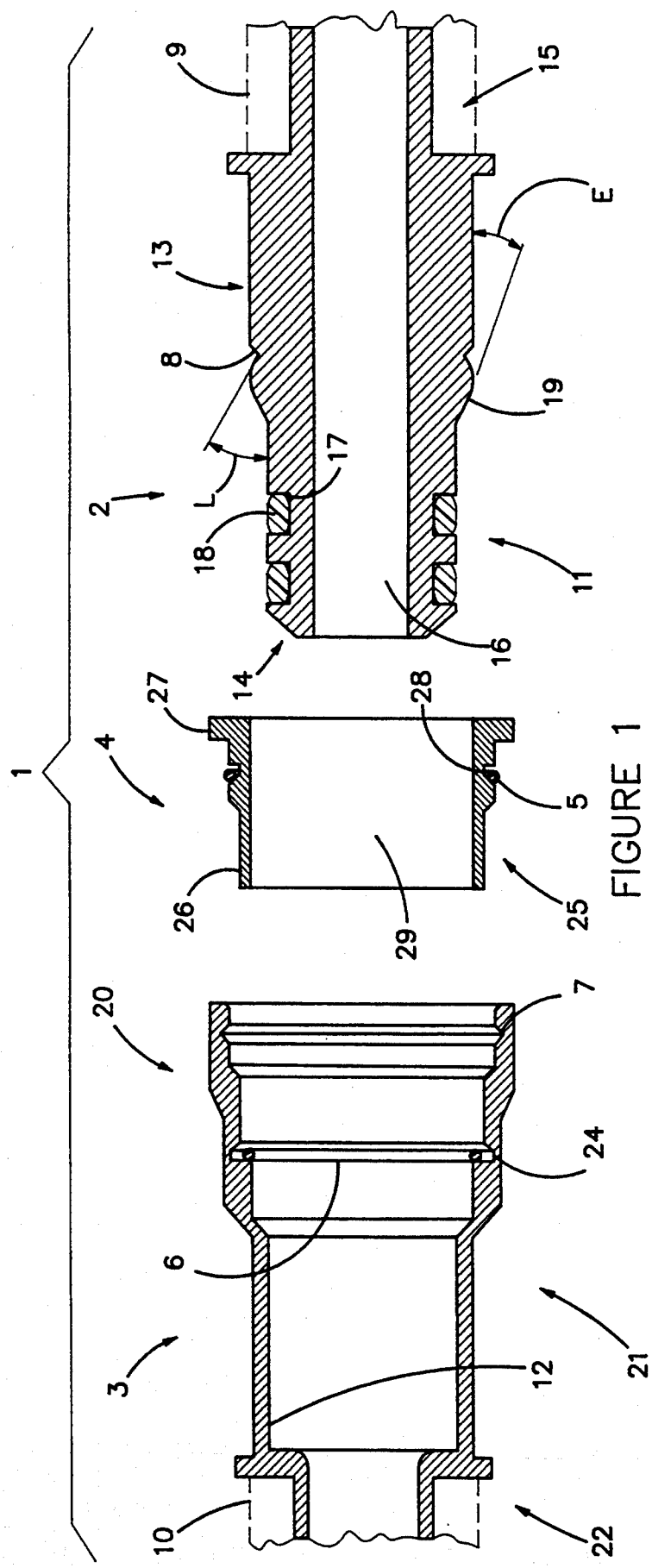
FIG. 1 is an exploded, cross-sectional view of a preferred embodiment of the invention.
Figure 2:
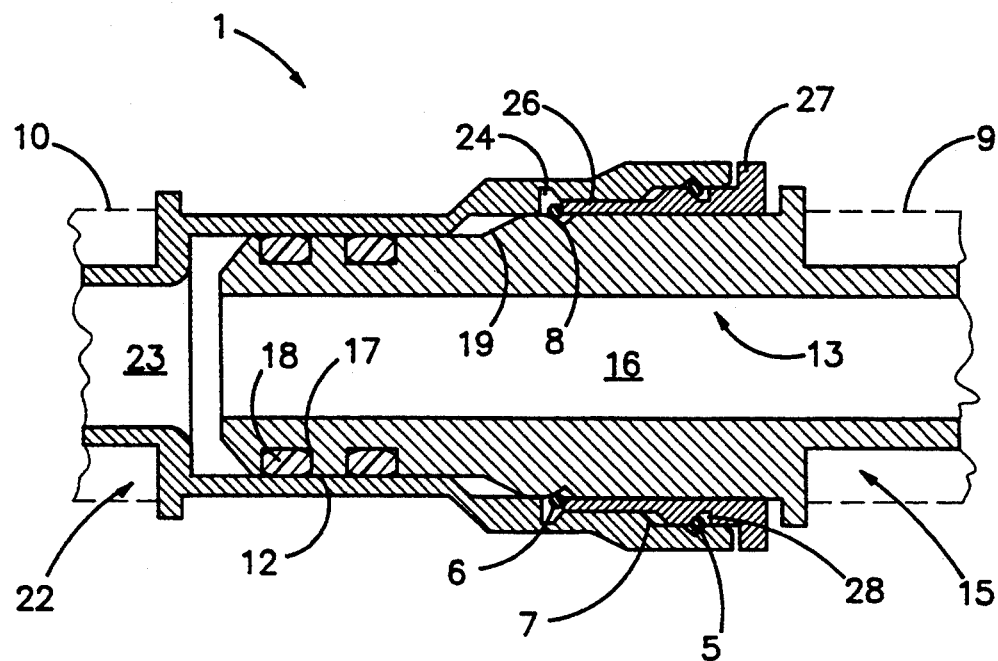
FIG. 2 is a cross-sectional view of the embodiment of FIG. 1 shown in an assembled and connected configuration.

Turning now to FIGS. 1 and 2, a preferred embodiment of the quick-connect conduit coupling 1 is shown in an exploded view, generally comprising insertion member 2, receiving member 3, and release collar 4. By way of overview, release collar 4 is slidably held within receiving member 3 by the cooperation of first resilient ring member 5 and first internal annular groove 7 in a manner that will be explained in more detail below. Insertion member 2 is designed to be inserted into receiving member 3 and locked therein by the cooperation of second resilient ring member 6 and first external annular groove 8 in a manner also to be further explained below. When insertion member 2 is locked within receiving member 3, a seal is created at the interface between sealing means 11 and mating surface 12 for enabling continuous fluid flow through first and second conduit sections 9,10. Release collar 4 is used to disconnect coupling 1 for maintenance or repair by disengaging second resilient ring member 6 from groove 8.

Figure 5:
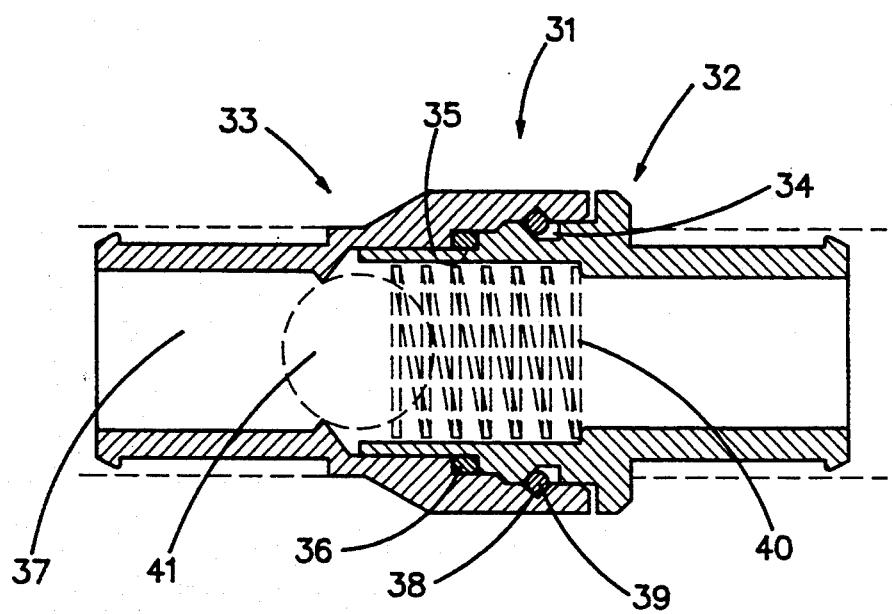
FIG. 5 is a cross-sectional view of an alternate embodiment of the invention in a check valve application which is less susceptible to disassembly.

Insertion member 2 comprises an elongated body portion 13 having a front end 14 and a rear end 15, as well as a first axial passageway 16 therethrough. Rear end 15 is inserted within first conduit section 9 and may take on any convenient shape which establishes a firm and sealed grip on first conduit section 9. One shape for rear end 15 which is well known to those in the art is shown in FIG. 5, and would be suitable if the conduit is flexible. Front end 14 includes sealing means 11 for establishing a seal within the coupling 1 when insertion member 2 and receiving member 3 are locked together. In the preferred embodiment of FIGS. 1 and 2, sealing means 11 is depicted as a pair of parallel annular grooves 17 which each retain an O-ring 18 constructed of a common elastomeric material. Annular ramp 19 is formed behind sealing means 11 from the gradual expansion of the diameter of body portion 13. For reasons that will be elaborated on below, the preferred expansion angle E of the surface immediately preceding annular ramp 19 is about 15° from horizontal. Similarly, first external annular groove 8 is formed behind annular ramp 19 by the contraction of the diameter of body portion 13 at a preferred lock angle L of about 30°.

Receiving member 3 is generally cylindrical in shape and comprises a front end 20, a middle section 21 and a rear end 22. Rear end 22 can take any shape that will offer a sealed grip with second conduit section 10, similar to rear end 15 of insertion member 2. A second axial passageway 23 extends through receiving member 3 and includes a circumferential mating surface 12 for sealingly contacting O-rings 18 when coupling 1 is connected. A first internal annular groove 7 is formed near front end 20 of receiving member 3 which retains first ring member 5 when release collar 4 is assembled to receiving member 3. Second internal annular groove 24 is formed behind first internal annular groove 7 and loosely retains second ring member 6 prior to assembly and operation. Both first and second resilient ring members 5,6 may be constructed of stainless steel or any other suitable material which (1) has a modulus of elasticity which will allow expansion and contraction of ring members 5,6 around their respective pans during assembly and operation, and (2) is stiff enough to prevent accidental disengagement of insertion member 2 from receiving member 3 when coupling 1 is subjected to tensile stresses. In the preferred embodiment, metal rings having a single cut therein are used, and are often referred to as lock rings or split rings. Such split rings are inexpensive and readily obtainable from a wide variety of sources. The importance of these properties will become more apparent when the assembly and operation of coupling 1 is discussed below.

Figure 3:
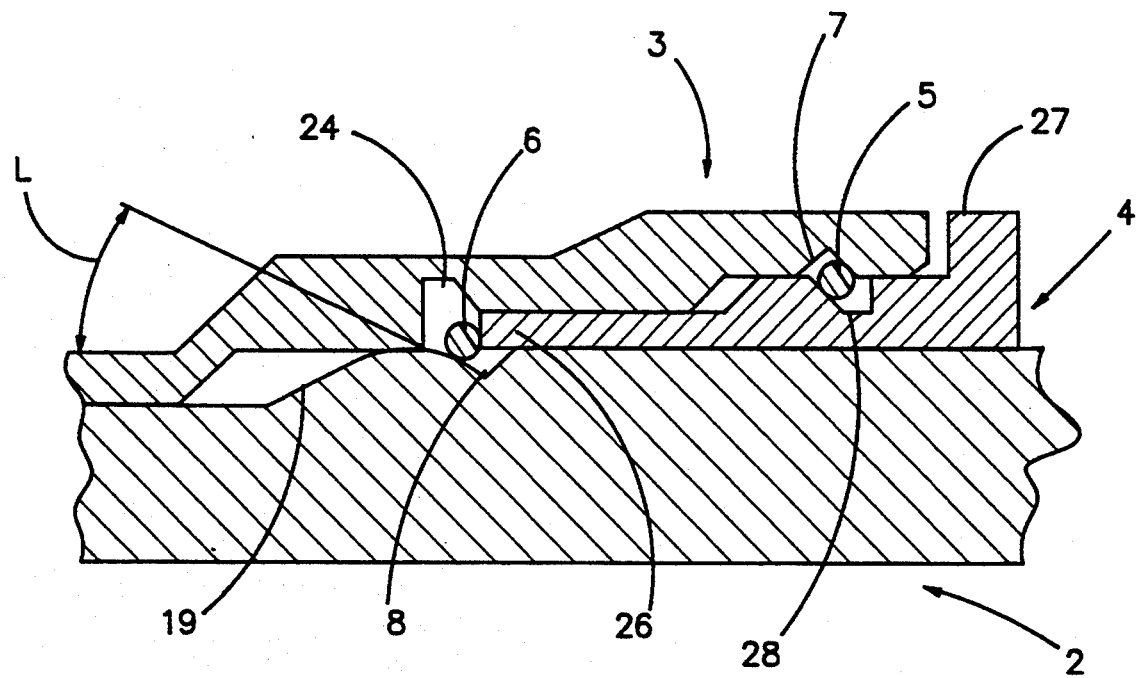
FIG. 3 is a closer view of the embodiment of FIG. 2 in a locked position.
Figure 4:
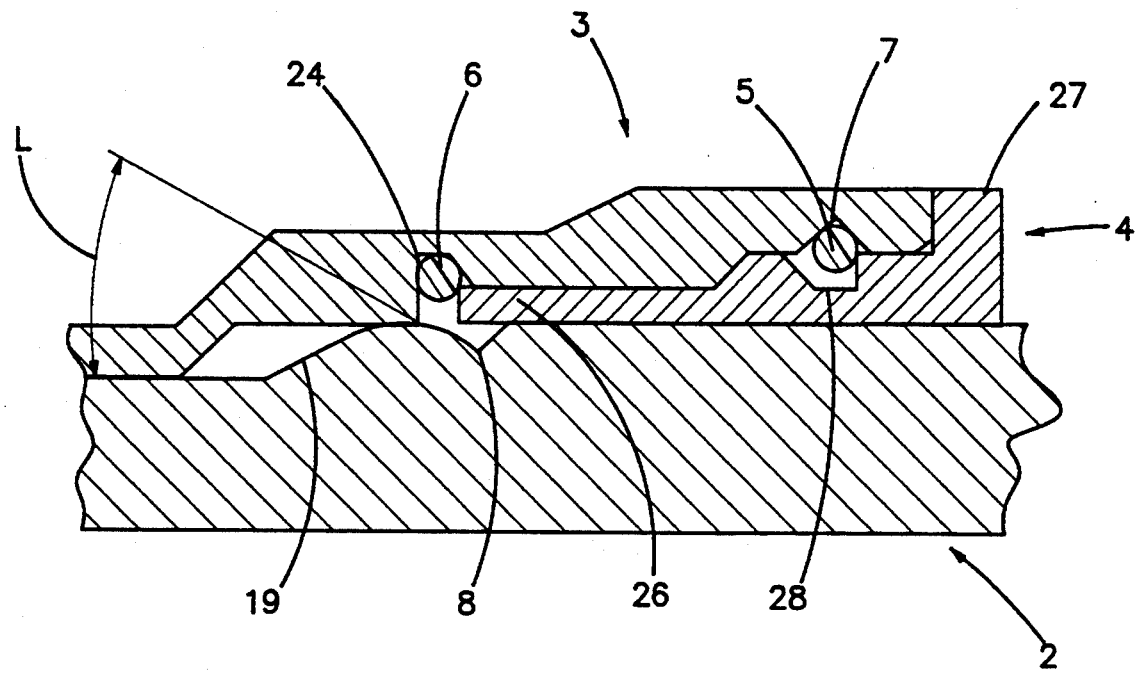
FIG. 4 is a closer view of the embodiment of FIG. 2 in a released position.

Release collar 4 is used to disengage insertion member 2 from receiving member 3 and comprises a sleeve-shaped body portion 25 having an axial bore 29, a release tip 26, and a handle portion 27. Second external annular groove 28 is formed between release tip 26 and handle portion 27, and is used to assist in the assembly of release collar 4 to receiving member 3, as well as to allow slidable movement of release collar 4 relative to receiving member 3. Axial bore 29 is sized to allow the insertion of insertion member 2 with a snug but slidable fit therebetween. When assembled, release tip 26 extends slightly into the space between second internal annular groove 24 and first external annular groove 8 as shown in FIGS. 2–4.

ASSEMBLY AND OPERATION

Prior to use in the environment for which coupling 1 is intended, release collar 4 must be permanently secured within receiving member 3. Second ring member 6 is radially contracted and placed inside receiving member 3 until it snaps into place within second internal annular groove 24. Second ring member 6 should be retained securely therein, but loosely enough so that it can be radially expanded upon entry of insertion member 2 during operation. First ring member 5 is then radially contracted around release collar 4 so that it rests deep within second external annular groove 28. Keeping ring member 5 in a contracted state, release collar 4 is then inserted into receiving member 3 with release tip 26 entering first. When release collar 4 is fully inserted, ring member 5 snaps into place within first internal annular groove 7. Because groove 7 is small enough to allow a portion of ring member 5 to remain exposed within second axial passageway 23, release collar 4 is therefore permanently retained within receiving member 3. However, second external annular groove 28 is sized to allow release collar 4 to slide within receiving member 3 a short distance. These particular features are readily seen in FIGS. 3 and 4. It is preferred that the above operations occur at the coupling manufacturing facility so that coupling 1 can then simply be connected as explained below.

Once second ring member 6 and release collar 4 are assembled within receiving member 3, connection of coupling 1 is simple and quick to accomplish by pushing insertion member 2 into receiving member 3 until it snaps into place. During insertion, as O-rings 18 begin to sealingly contact mating surface 12, second ring member 6 is caused to radially expand within the confines of second internal annular groove 24 by the action of annular ramp 19 along expansion angle E. After being maximally expanded, second ring member 6 then snaps around insertion member 2 into first external annular groove 8. This action serves to push back on release tip 26 of release collar 4 as shown in FIGS. 2 and 3. If tensile forces are applied to insertion member 2, resistance will be created by the contact between second ring member 6 and the side of groove 8 subject to lock angle L. Therefore, second ring member 6 will not move, because it is compressed between insertion member 2 and second internal annular groove 24.

To disconnect coupling 1, handle portion 27 of release collar 4 is pushed toward receiving member 3 by any appropriate tool, such as a screwdriver or similar device. When release collar 4 is urged inward, release tip 26 pushes uniformly on second ring member 6 and causes second ring member 6 to expand out of first external annular groove 8 along lock angle L and into second internal annular groove 24. Insertion member 2 can thus be removed from receiving member 3, allowing second ring member 6 to relax to its normal condition of being loosely retained within second internal annular groove 24. It will be understood by those of ordinary skill that if lock angle L is too steep, it may be difficult to disengage second ring member 6 from groove 8. Likewise, if lock angle L is too small, insertion member 2 may accidentally be pulled from receiving member 3 without the action of release collar 4.

From the foregoing description of the preferred embodiment, it can be appreciated that the coupling 1 offers many advantages. Most importantly, it achieves the objective of being extremely simply to connect by a single manipulation using only one hand, thus reducing manufacturing and assembly operations in whatever application environment in which it may be employed. Also, the sealed connection established by the interaction of insertion member 2 and receiving member 3 is very strong, as well as difficult to disconnect by accident, because insertion member 2 is held about its entire circumference by second ring member 6, as opposed to prior art ball devices. Further, the coupling 1 may be disconnected just as simply as prior art devices by using a common tool to urge release collar 4 into receiving member 3. Finally, the inventive coupling 1 is simpler and less inexpensive to manufacture and assemble than prior art couplings.

An alternate embodiment 31 of the invention is shown in FIG. 5, which creates a more permanent connection, and thus does not require release collar 4. Insertion member 32 includes an external annular groove 34 and a stepped portion 35. O-ring 36 is placed around insertion member 32 at stepped portion 35 to create a seal when inserted within receiving member 33. Receiving member 33 includes an axial passageway 37 sized to snugly accommodate insertion member 32, as well as an internal annular groove 38 for retaining resilient ring member 39.

Assembly of the alternate embodiment closely resembles the assembly of release collar 4 into receiving member 3 in the preferred embodiment. Resilient ring member 39 is radially contracted around insertion member 32 so that it rests deep within external annular groove 34. Keeping ring member 39 in a contracted state, insertion member 32 is then inserted into receiving member 33. When insertion member 32 is fully inserted, O-ring 36 is compressed between stepped portion 35 and receiving member 33, and ring member 39 snaps into place within internal annular groove 38. Because groove 38 is small enough to allow a portion of ring member 39 to remain exposed within axial passageway 37, insertion member 32 is therefore permanently retained within receiving member 33. Of course, this alternate embodiment has many applications where permanency of the connection may be important, such as in check valves. FIG. 5 shows the manner in which the invention may be used in a check valve application, as indicated by the presence of spring 40 and ball 41 captively held within axial passageway 37. As with the preferred embodiment, this alternate version is also simple and inexpensive to manufacture.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. A coupling for connecting sections of conduit, comprising:
   (a) an insertion member having a front end and a rear end, said rear end connectable to a first conduit section, wherein said insertion member further comprises:
      (i) a first axial passageway in fluid communication with said first conduit section;
      (ii) sealing means operatively attached to said front end for sealingly contacting a mating surface;
      (iii) a first external annular groove between said sealing means and said rear end; and
      (iv) an annular ramp between said sealing means and said first external annular groove;
   (b) a receiving member having a front end and a rear end, said rear end connectable to a second conduit section, wherein said receiving member further comprises:
      (i) a second axial passageway, in fluid communication with said second conduit section, sized to receive said front end of said insertion member;
      (ii) a mating surface within said second axial passageway having dimensions sized to sealably contact said sealing means of said insertion member;
      (iii) a first internal annular groove within said second axial passageway between said mating surface and said front end of said receiving member; and
      (iv) a second internal annular groove within said second axial passageway between said first internal annular groove and said mating surface;
   (c) a release collar, slidably and captively disposed within said receiving member, having a release tip and a handle portion, said release collar further comprising:

(i) an axial bore sized to receive said front end of said insertion member;

(ii) a second external annular groove between said release tip and said handle portion;

(iii) wherein said release tip is slidably movable into the space between said second internal annular groove of said receiving member and said first external annular groove of said insertion member; and (d) a first resilient ring member disposed within said first internal annular groove of said receiving member and said second external annular groove of said release collar, to prevent said release collar from withdrawing from said receiving member, and wherein said second external annular groove is sized to allow said release collar to slide relative to said receiving member; and (e) a second resilient ring member retained within said second internal annular groove of said receiving member, said second resilient ring member formed to resiliently expand over said annular ramp and to resiliently contract into said first external annular groove of said insertion member while remaining retained within said second internal annular groove of said receiving member when said sealing means is caused to contact said mating surface; and wherein said release tip is slidably movable to a position whereby said release tip pushes uniformly on said second resilient ring member, causing said second resilient ring member to expand out of said first external annular groove and into said second internal annular groove thereby permitting separation of said insertion member from said receiving member.

2. The coupling according to claim 1, wherein said sealing means comprises an O-ring.

3. The coupling according to claim 1, wherein said sealing means comprises:

(a) a third external annular groove formed in said front end of said insertion member; and (b) an O-ring retained within said third external annular groove.

4. The coupling according to claim 1, wherein said first resilient ring member is resiliently biased against said first internal annular groove of said receiving member.

* * * * *